US012641003B2

(12) United States Patent
Kumar et al.

(10) Patent No.: US 12,641,003 B2
(45) Date of Patent: May 26, 2026

(54) SYSTEM AND METHOD FOR INDEXING OF INTERNET PROTOCOL (IP) PACKETS

(71) Applicant: Vehere Interactive Pvt Ltd, Kolkata (IN)

(72) Inventors: Praveen Kumar, Kolkata (IN); Naveen Jaiswal, Kolkata (IN); Aarav Jaiswal, Kolkata (IN)

(73) Assignee: Vehere Interactive Pvt Ltd, Kolkata (IN)

( * ) Notice: Subject to any disclaimer, the term of this patent is extended or adjusted under 35 U.S.C. 154(b) by 77 days.

(21) Appl. No.: 18/829,474

(22) Filed: Sep. 10, 2024

(65) Prior Publication Data

US 2025/0323855 A1      Oct. 16, 2025

(30) Foreign Application Priority Data

Apr. 12, 2024    (IN) ............................. 202431029797

(51) Int. Cl.
| | |
|---|---|
| *G06F 15/16* | (2006.01) |
| *H04L 43/106* | (2022.01) |
| *H04L 43/16* | (2022.01) |
| *H04L 67/146* | (2022.01) |

(52) U.S. Cl.
CPC ............ *H04L 43/106* (2013.01); *H04L 43/16* (2013.01); *H04L 67/146* (2013.01)

(58) Field of Classification Search
CPC ...... H04L 43/106; H04L 43/16; H04L 67/146

USPC ......................................................... 709/224
See application file for complete search history.

(56) References Cited

U.S. PATENT DOCUMENTS

| | | | |
|---|---|---|---|
| 11,159,438 B1 * | 10/2021 | Badart | H04L 47/41 |
| 2010/0189256 A1 * | 7/2010 | Doehla | H04N 21/4381 |
| | | | 380/221 |
| 2010/0189424 A1 * | 7/2010 | Doehla | H04N 21/2381 |
| | | | 386/241 |
| 2015/0180963 A1 * | 6/2015 | Luecke | H04L 45/124 |
| | | | 709/203 |
| 2016/0337672 A1 * | 11/2016 | Lee | H04L 1/004 |
| 2018/0278509 A1 * | 9/2018 | Greene | H04L 67/146 |
| 2021/0266333 A1 * | 8/2021 | Wright | H04L 63/1408 |

* cited by examiner

*Primary Examiner* — Normin Abedin
(74) *Attorney, Agent, or Firm* — Kolisch Hartwell, P.C.

(57) ABSTRACT

A system and method for indexing Internet Protocol (IP) packets receives, at a first timestamp, a first IP packet of a first network session of a set of network sessions. The system determines a first metadata of the first network session that includes a first set of data structures associated with the first IP packet. Using a second set of data structures, the system determines a first identifier associated with a first data structure of a third set of data structures. The system also stores first payload information associated with the first IP packet in the first data structure. The system also receives a second IP packet associated with the first network session at a second timestamp. The system also stores second payload information associated with the second IP packet in either the first data structure or a second data structure.

20 Claims, 7 Drawing Sheets

SYSTEM AND METHOD FOR INDEXING OF INTERNET PROTOCOL (IP) PACKETS

TECHNOLOGICAL FIELD

The disclosure relates to the indexing of internet protocol (IP) packets and, more specifically, to a system and a method for indexing IP packets.

BACKGROUND

Internet Protocol (IP) packets are fundamental units of data transmission in computer networks. The IP packets carry payload data, a source IP address, and a destination IP address, to facilitate the routing of payload data across the internet. These IP packets are one of the key components of an internet protocol suite, enabling communication between devices in a computer network. Such IP packets come in different versions, with Internet Protocol version 4 (IPv4) and Internet Protocol version 6 (IPv6) being the most commonly used. Each IP packet encapsulates data and control information, making it possible for devices to exchange information across local and global networks efficiently.

The rapid expansion of network communication has generated an unprecedented volume of data in the form of IP packets, which include critical information for tasks such as network performance monitoring, security analysis, and network forensics. At the arrival of this data is the need for efficient packet capture, retrieval, and management solutions, especially in high-speed networks transmitting data at the rate of 10 gigabits per second and beyond.

Conventional packet capture techniques often struggle to cope with such high data rates and strain the resources of storage systems, making it challenging to capture, organize, and retrieve IP packets efficiently. Such conventional packet capture techniques usually rely on storing data in formats like a Packet Capture (PCAP) file format. While such formats are widely recognized, they come with several inherent limitations, particularly when dealing with high-speed, high-volume network traffic. These files typically lack systematic organization, clear naming conventions, and efficient segregation of IP packets, making it challenging to retrieve specific IP packets associated with time intervals or network sessions. Insufficient packet retrieval, resource-intensive storage, redundancy, and performance limitations are some of the common issues. Further, storing a continuous stream of IP packets is resource-intensive, as PCAP files grow rapidly with time. This requires substantial disk space and a high number of input/output operations for packet capture, storage, and retrieval.

Therefore, there is a need for a method and a system for addressing the above-mentioned challenges systematically, offering a more streamlined and high-performance approach to network packet capture and management in modern network infrastructure.

BRIEF SUMMARY

In comparison with the conventional packet capture techniques, the present disclosure may provide a system and a method that focuses on internet protocol (IP) packet indexing. The disclosed system incorporates techniques that may enhance user experience in network packet management and analysis. Furthermore, this may significantly enhance the capabilities of network forensics, making it an invaluable asset for security incident response and investigation. This efficiency may extend to an optimized storage utilization, resulting in cost savings and an improved overall network performance.

In one aspect, a system for indexing internet protocol (IP) packets is provided. The system may include at least one processor and at least one non-transitory memory including computer program code instructions. The system may receive, at a first timestamp, a first Internet Protocol (IP) packet associated with a first network session of a set of network sessions. The processor may be further configured to determine first metadata associated with the first network session. The first metadata may include a first set of data structures associated with the received first IP packet. The processor may be further configured to determine, using a second set of data structures, a first identifier associated with a first data structure of a third set of data structures. The processor may be further configured to store a first payload information associated with the first IP packet in the first data structure of the third set of data structures. The processor may be further configured to receive a second IP packet associated with the first network session at a second timestamp. The processor may be further configured to store packet second payload information associated with the received second IP packet in one of the first data structure or a second data structure of the third set of data structures based on the first timestamp and the second timestamp.

In additional system embodiments, the second set of data structures corresponds to a ring buffer.

In additional system embodiments, each of the third set of data structures may be associated with a set of IP packets associated with the set of network sessions received in one second. The set of IP packets may include the first IP packet and the second IP packet.

In additional system embodiments, the processor may be further configured to calculate a time interval between the first timestamp associated with the first IP packet and the second timestamp associated with the second IP packet. The processor may be further configured to compare the calculated time interval between the first timestamp and the second timestamp with a first pre-determined timeout threshold.

In additional system embodiments, the processor may be further configured to store the second payload information in the first data structure of the third set of data structures based on a determination that the calculated time interval is less than the first pre-determined timeout threshold.

In additional system embodiments, the processor may be further configured to store the second payload information in the second data structure of the third set of data structures based on a determination that the calculated time interval is greater than the first pre-determined timeout threshold.

In additional system embodiments, the first pre-determined timeout threshold may be equal to one second.

In additional system embodiments, the first set of data structures in the first metadata may include the first timestamp and a first address associated with a first location of the first payload information stored in the first data structure of the third set of data structures.

In additional system embodiments, the processor may be further configured to determine a second address associated with a second location of the second payload information stored in the second data structure of the third set of data structures. The processor may be further configured to store the determined second address in the first data structure of the third set of data structures. The processor may be further configured to determine a third address associated with a third location of a third payload information of a third IP packet associated with the first network session. The third payload information may be stored in a third data structure of the third set of data structures. The processor may be further configured to store the determined third address in the second data structure of the third set of data structures.

In additional system embodiments, the processor may be configured to create a raw file corresponding to each data structure of the third set of data structures.

In additional system embodiments, the first payload information may be stored in a first raw file associated with the first data structure of the third set of data structures. The second payload information may be stored in a second raw file associated with the second data structure of the third set of data structures.

In additional system embodiments, the processor may be configured to dump a raw file associated with each of the third set of data structures into a memory of the system after a pre-set time period.

In additional system embodiments, the each of the second set of data structures may include at least a first field that may include a first pointer that points to a corresponding data structure of the third set of data structures and a second pointer that points to an index within the corresponding data structure of the third set of data structures.

In additional system embodiments, the first payload information stored in a first raw file may include a first header. The first header may include a packet length associated with the second payload information, a name associated with the second payload location information, and an offset associated with the second payload location information.

In additional system embodiments, the processor may be further configured to calculate a time interval between the first timestamp associated with the first IP packet and the second timestamp associated with the second IP packet. The processor may be further configured to compare the calculated time interval between the first timestamp and the second timestamp with a second pre-determined timeout threshold.

In additional system embodiments, the processor may be further configured to generate, based on a determination that the calculated time interval may be greater than the second pre-determined timeout threshold, second metadata that may include the second timestamp and a second address associated with a second location of the second payload information stored in the second data structure of the third set of data structures. The processor may be further configured to create a second data structure of the first set of data structures based on the generated second metadata. Further, the processor may be configured to store the created second data structure of the first set of data structures.

In additional system embodiments, the processor may be further configured to receive a user request associated with a retrieval of the first payload information and the second payload information. The processor may be further configured to determine a first address associated with a first location of the first payload information stored in the first data structure of the third set of data structures based on the received user request. The processor may be further configured to retrieve the first payload information from the first data structure. Further, the processor may be configured to retrieve the second payload information based on the determined second address.

In another aspect, a method for internet protocol (IP) packet indexing is provided. The method may include receiving, at a first timestamp, a first Internet Protocol (IP) packet associated with a first network session of a set of network sessions. The method may further include determining first metadata associated with the first network session. The first metadata may include the first set of data structures associated with the received first IP packet. The method may further include determining, using a second set of data structures, a first identifier associated with a first data structure of a third set of data structures. The method may further include storing a first payload information associated with the first IP packet in the first data structure of the third set of data structures based on the determined first identifier. The method may further include receiving a second IP packet associated with the first network session at a second timestamp. The method may further include storing a second payload information associated with the received second IP packet in one of the first data structure or a second data structure of the third set of data structures based on the first timestamp and the second timestamp. The method may further include retrieving the first payload information from the first data structure. Further, the method may include determining a second address associated with a second location of the second payload information stored in the second data structure of the third set of data structures. The method may further include retrieving the second payload information based on the determined second address.

In yet another aspect, a non-transitory computer-readable storage medium carrying one or more sequences of one or more instructions which, when executed by at least one processor, cause a system to perform operations comprising receiving, at a first timestamp, a first Internet Protocol (IP) packet associated with a first network session of a set of network sessions. The operations may further include determining first metadata associated with the first network session. The first metadata may include the first set of data structures associated with the received first IP packet. The operations may further include determining, using a second set of data structures, a first identifier associated with a first data structure of a third set of data structures. The operations may further include storing a first payload information associated with the first IP packet in the first data structure of the third set of data structures based on the determined first identifier. The operations may further include receiving a second IP packet associated with the first network session at a second timestamp. The operation may further include storing a second payload information associated with the received second IP packet in one of the first data structure or a second data structure of the third set of data structures based on the first timestamp and the second timestamp.

BRIEF DESCRIPTION OF THE DRAWINGS

Figure 1:
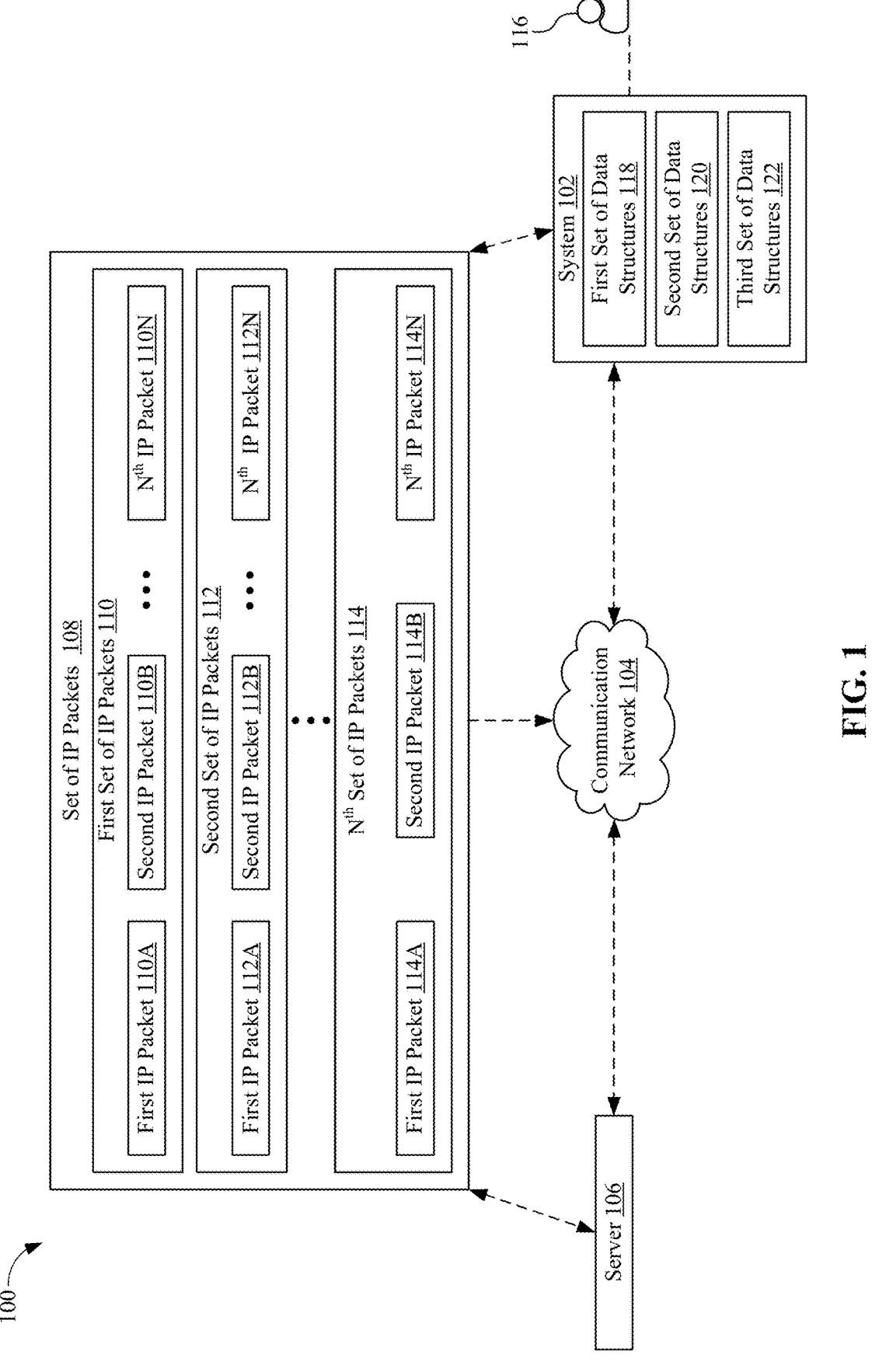
Figure 2:
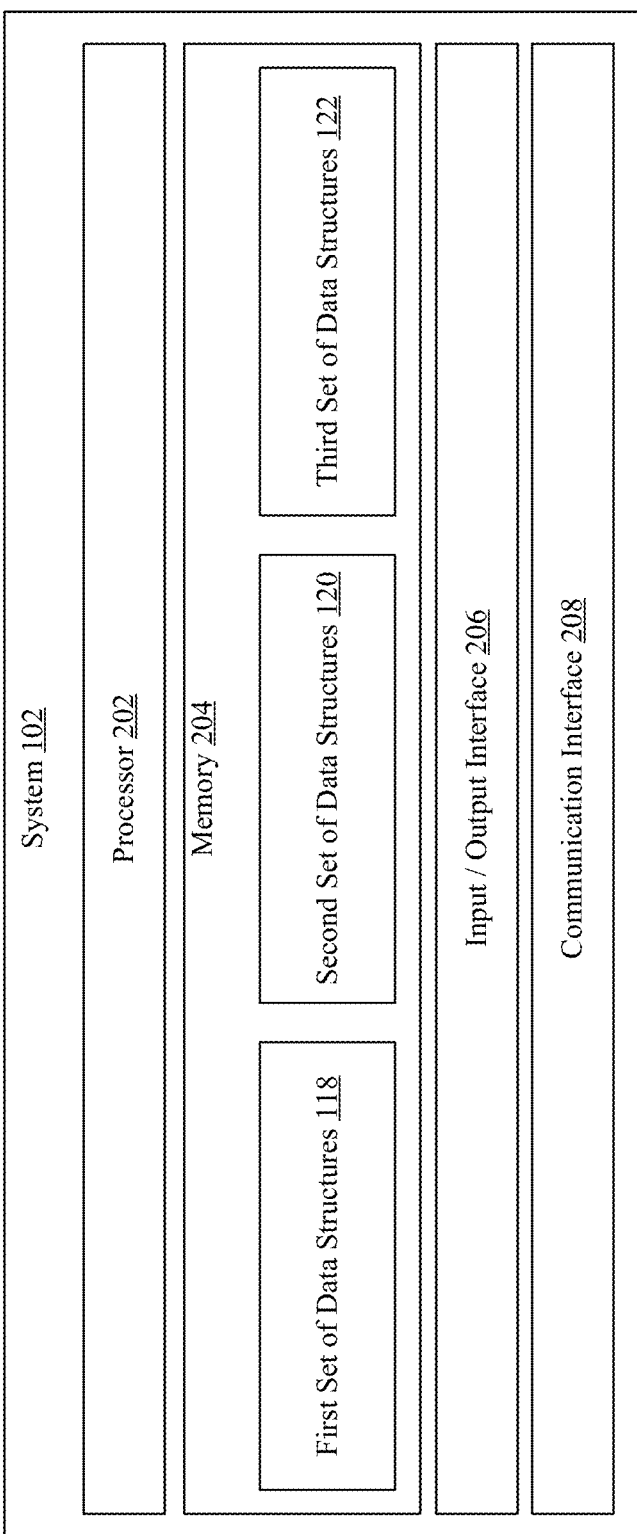
Figure 3:
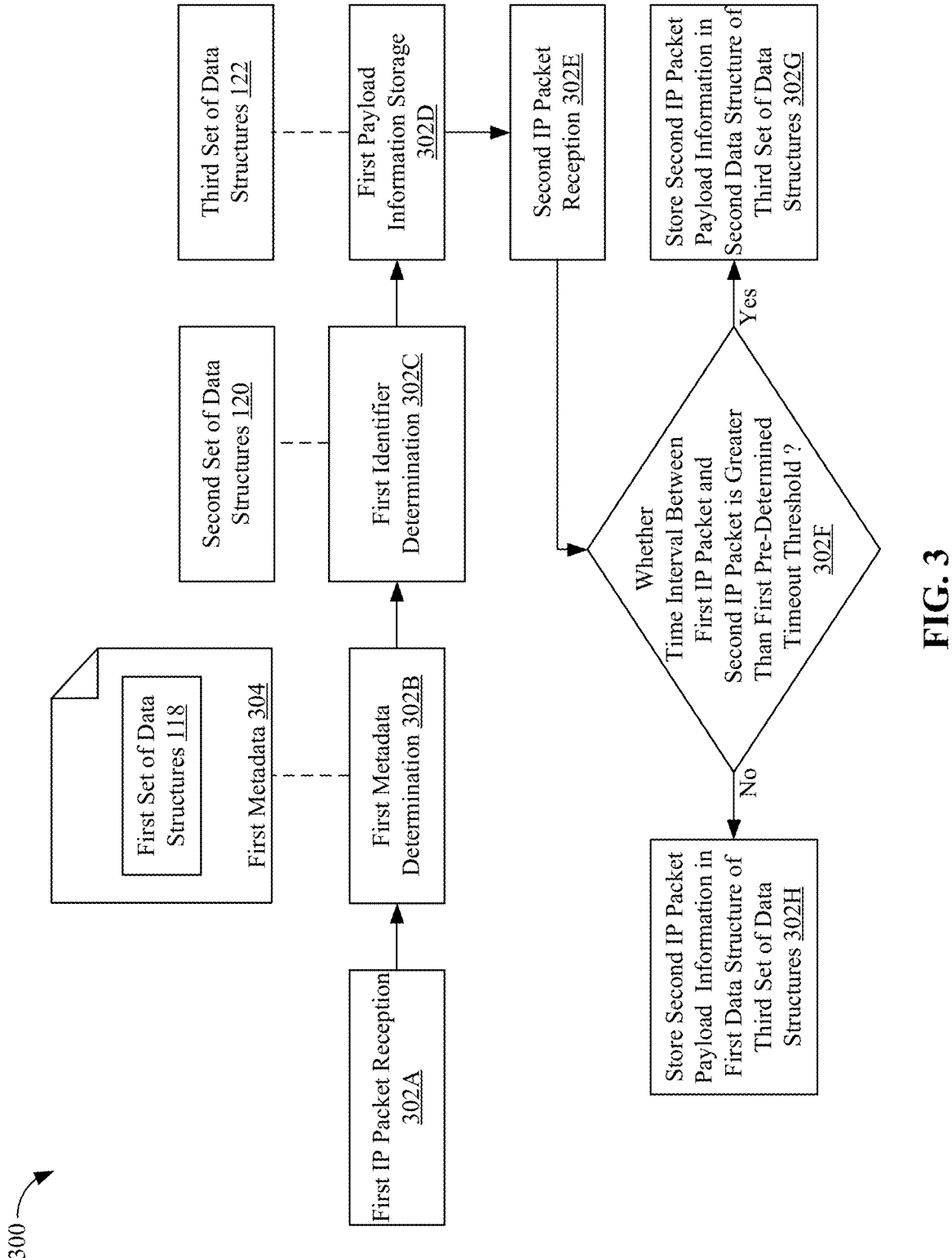
Figure 4:
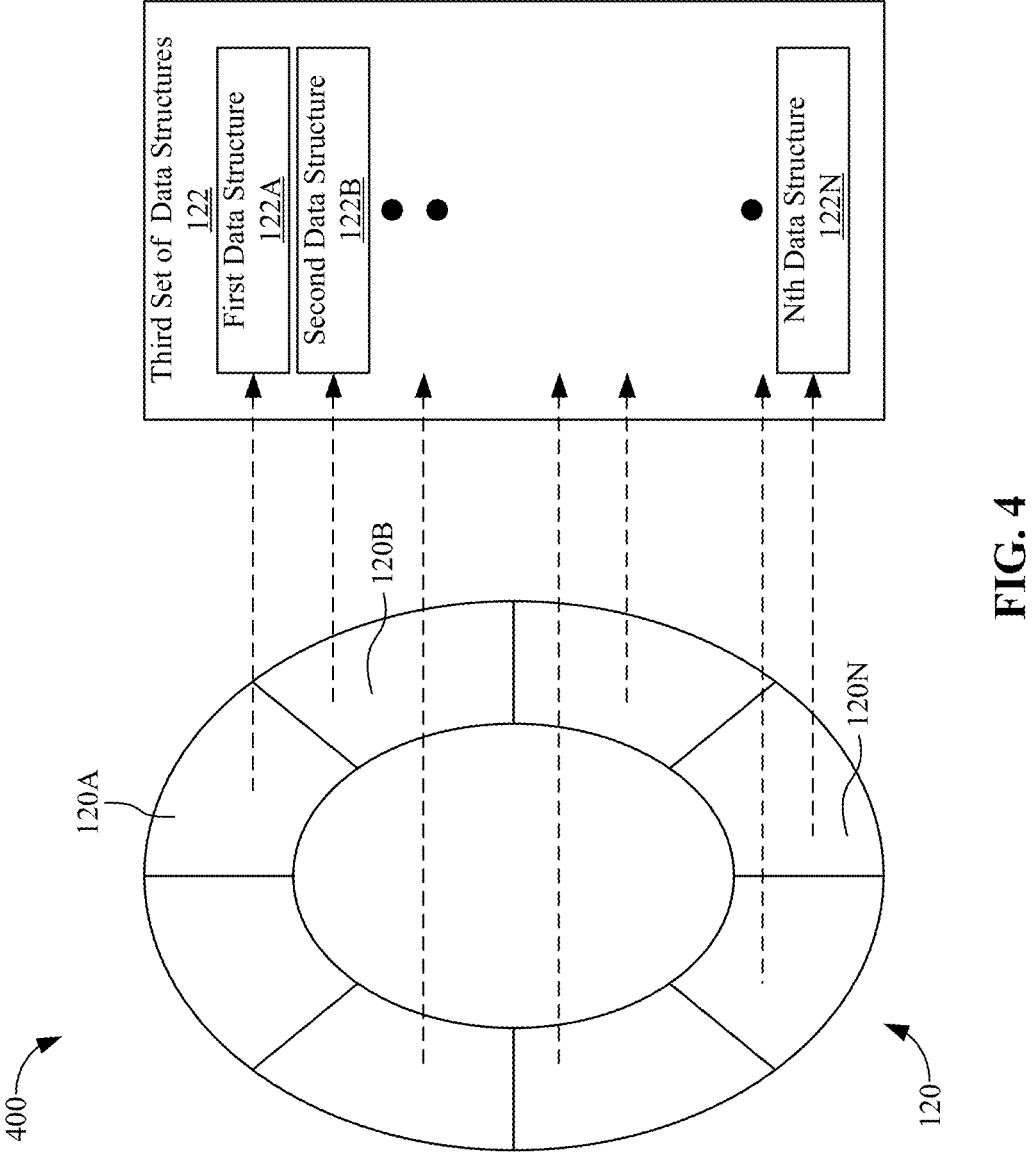
Figure 5:
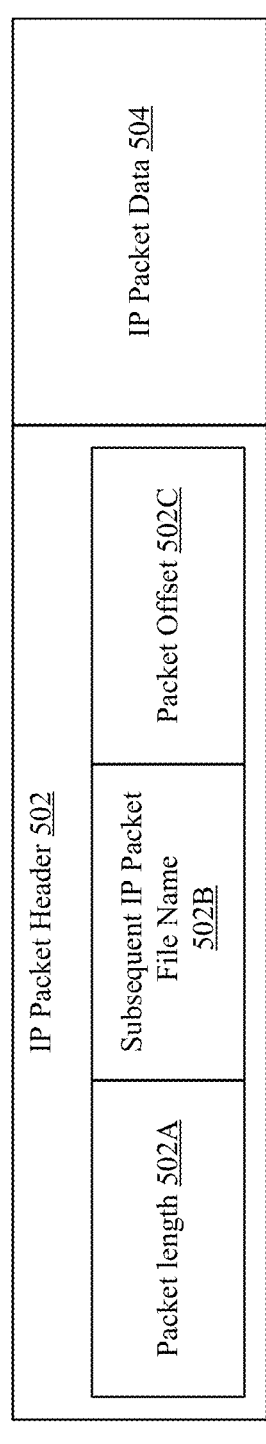
Figure 6:
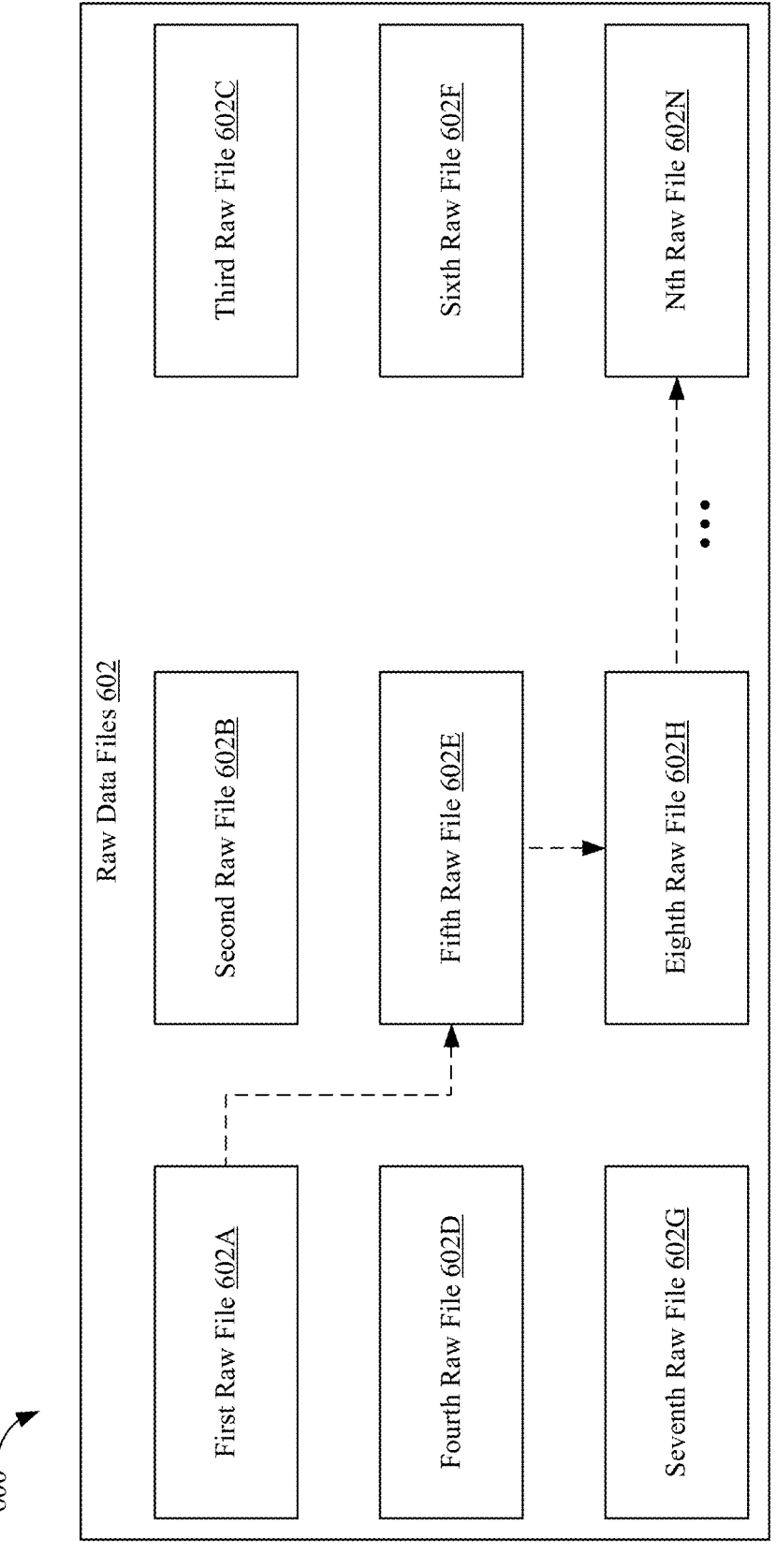
Figure 7:
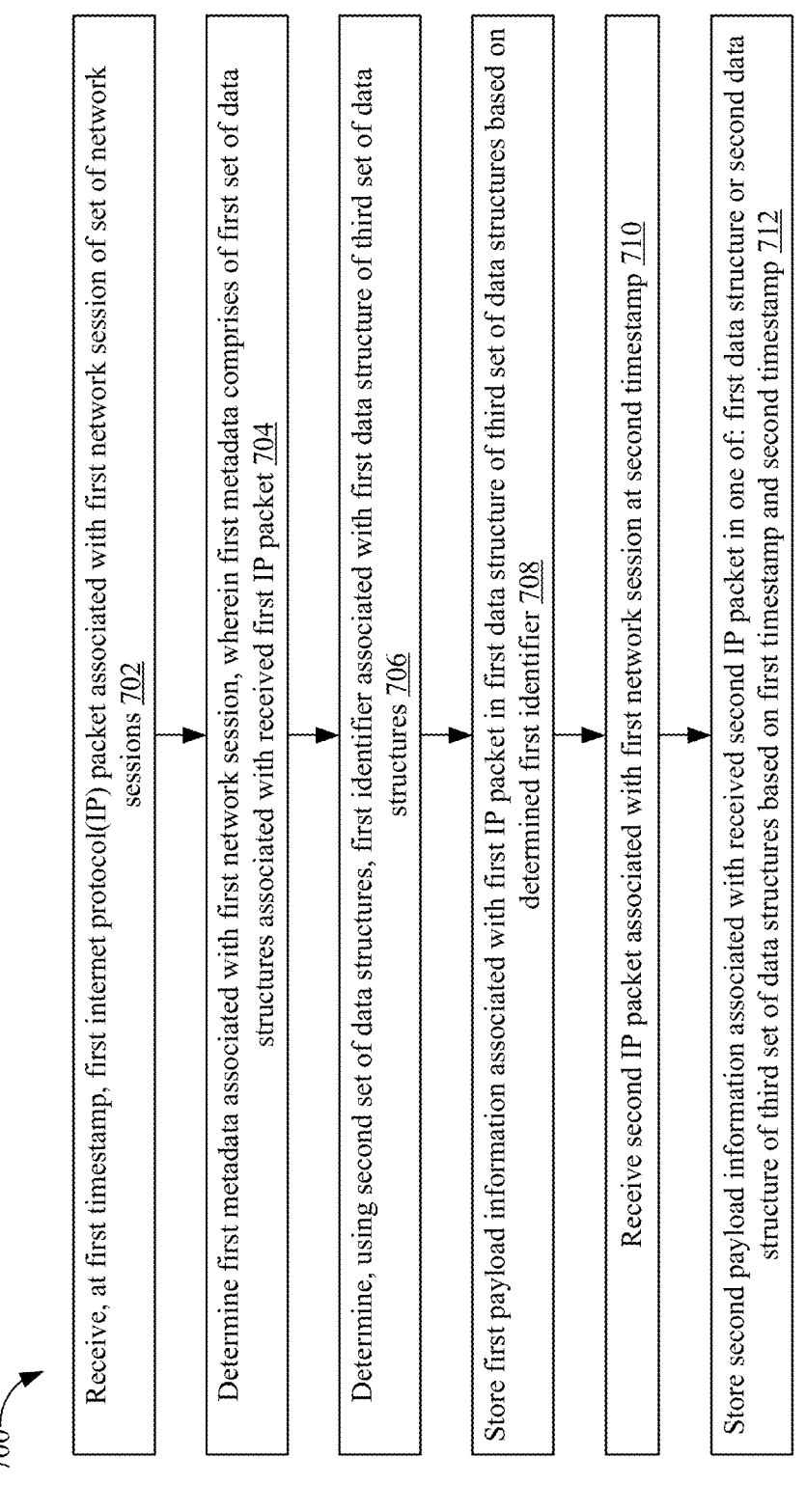

Having thus described example embodiments of the invention in general terms, reference will now be made to the accompanying drawings, which are not necessarily drawn to scale, and wherein:

FIG. 1 is a diagram that illustrates a network environment within which a system for indexing IP packets is implemented, in accordance with an embodiment of the disclosure;

FIG. 2 illustrates a block diagram of the system of FIG. 1, in accordance with an embodiment of the disclosure;

FIG. 3 is a diagram that illustrates exemplary operations for indexing IP packets, in accordance with an embodiment of the disclosure;

FIG. 4 is a diagram that illustrates exemplary indexing of IP packets using a ring buffer and a raw buffer, in accordance with an embodiment of the disclosure;

FIG. 5 is a diagram that illustrates a structure of the IP Packet flowing through the communication network, in accordance with an embodiment of the disclosure;

FIG. 6 is a block diagram that illustrates raw data files stored in memory, in accordance with an embodiment of the disclosure; and FIG. 7 is a flowchart that illustrates an exemplary method for indexing IP packets, in accordance with an embodiment of the disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect. Turning now to FIG. 1-FIG. 7, a brief description concerning the various components of the present disclosure will now be briefly discussed. Reference will be made to the figures showing various embodiments of a system for indexing IP packets.

FIG. 1 is a diagram that illustrates a network environment 100 within which a system 102 for indexing IP packets is implemented, in accordance with an embodiment of the disclosure. The network environment 100 may include a system 102, a communication network 104, a server 106, and a set of IP packets 108 associated with a set of network sessions. The set of IP packets 108 may include, but is not limited to, a first set of IP packets 110, a second set of IP packets 112, and an Nth set of IP packets 114. The first set of IP packets 110 may be associated with a first network session. The first set of IP packets 110 may include, but are not limited to, a first IP packet 110A, a second IP packet 110B, and an Nth IP packet 110N. The second set of IP packets 112 may be associated with a second network session. The second set of IP packets 112 may include, but is not limited to, a first IP packet 112A, a second IP packet 112B, up to an Nth IP packet 112N. Similarly, the Nth set of IP packets 114 may be associated with an Nth network session. The Nth set of IP packets 114 may include, but is not limited to, a first IP packet 114A, a second IP packet 114B, and an Nth IP packet 114N. With reference to FIG. 1, there is further shown a user 116 who may be associated with the system 102. The system 102 may further include a first set of data structures 118, a second set of data structures 120, and a third set of data structures 122.

The system 102 may be a highly specialized system that may integrate a hardware and a software to enhance network visibility and forensic capabilities. The system 102 may be equipped with a high-speed network interface, a multi-core processor, and a memory, the hardware configuration may support real-time packet processing and analysis. The custom software may orchestrate the communication network 104 monitoring process. The system 102 may further excel at session identification, packet indexing, storage, and retrieval. The system 102 may be optimized for capturing packets from high-speed networks. For example, but not limited to, a 10 Giga bytes per second (GBPS) network. The system 102 may manage the network sessions and leverage the internet protocol (IP) packet indexing technique for efficient packet organization, storage, and retrieval. The system 102 may further provide data analysis, session reconstruction, real-time monitoring, and security enhancement capabilities. The first set of data structures 118 associated with the system 102 may include the metadata of the incoming set of IP packets 108.

The network environment 100 may further include the user 116. In an embodiment, the user 116 may be a person from a corporation's dedicated information technology (IT) and a network management team, a telecommunications service provider management team, and the like. The user 116 may be associated with the system 102 to monitor network traffic, troubleshoot issues, and ensure optimal network performance across diverse regions. The user 116 may be equipped with hardware and software of the system 102 to efficiently capture, index, and store a vast volume of the set of IP packets 108. The user 116 reliance on the system 102 may be critical in maintaining network integrity and uninterrupted business operations on a global scale.

The network environment 100 may further include the communication network 104. The communication network 104 associated with the network environment 100 may be a sophisticated and a versatile infrastructure designed to facilitate seamless data transmission, management, and retrieval. The communication network 104 may establish a connection between the server 106 and the system 102 associated with the user 116. The communication network 104 may play an important role in supporting a diverse range of communication types, including web browsing, email exchanges, real-time voice and video calls, and large-scale data transfers. The architectural design of the communication network 104 may incorporate various key elements and components, starting with a hierarchical network topology that may include core, distribution, and access layers to insure scalability, redundancy, and efficient data routing. Gateways and routers may be strategically positioned to connect local networks to the broader internet, efficiently managing the flow of data packets and ensuring proper routing. Network segmentation is a fundamental feature, with distinct Local Area Networks (LANs), Wide Area Networks (WANs), and data centers optimized to meet specific network requirements. The communication network 104 may adhere to established network protocols, including Transmission Control Protocol/Internet Protocol (TCP/IP), User Datagram Protocol (UDP), Hypertext Transfer Protocol (HTTP), Hypertext Transfer Protocol Secure (HTTPS), and Session Initiation Protocol (SIP), ensuring data consistency, reliability, and secure communication. Security may be a top priority, encompassing firewalls, intrusion detection and prevention systems, and encrypted protocols to safeguard data and network integrity. Load balancers may distribute incoming network traffic across multiple servers, enhancing network reliability and optimizing resource usage.

The communication network 104 administrators (such as the user 116) may employ one or more monitoring and analysis tools to track performance, identify bottlenecks, and respond promptly to network issues. The communication network 104 scalability allows for the addition of devices, resources, and users without compromising performance or reliability. The user 116 associated with the system 102 may monitor, configure, and maintain the entire communication network 104, ensuring an optimal operation. In summary, the communication network 104 may provide a robust infrastructure required for the network environment 100 to excel, supporting efficient data communication, management, and retrieval across various communication channels.

The network environment 100 may further include the server 106. The server 106 may be a specialized machine that may be designed for a specific task within the network environment 100. The server 106 may play a crucial role in responding to the user 116 request, processing data, and delivering the data efficiently. The server 106 may be designed for high-performance computing and data handling, ensuring that the user 116 requests may be handled accordingly and that the requested content is delivered to the user 116 seamlessly. Load balancing and redundancy further enhance the reliability, and the one or more servers in various locations worldwide optimize content delivery for the user 116 anywhere around the globe. For example, the server 106 may include but is not limited to, a mail server, a data server, an application server, or a database server.

The network environment 100 may further include the set of IP packets 108. The set of IP packets 108 may be a foundation of data transmission across the communication network 104 (that may include the internet). Each IP packet of the set of IP packets 108 may include at least two components: header data and payload data. The header data may include metadata that may include the source IP address, a destination IP address, a packet length, a time-to-live (TTL), and a checksum to verify data integrity. The payload data may include actual data, for example, but not limited to, web content, emails, and multimedia streams. The set of IP packets 108 may play an important role in the functioning of the Internet Protocol, enabling the efficient routing of data across communication network 104.

The set of IP packets 108 may include IP packets from the set of network sessions. For example, each of the first set of IP packets 110 may be associated with a first network session (or first session), the second set of IP packets 112 may be associated with a second network session, and the Nth set of IP packets 114 may be associated with an Nth network session. The network session may refer to a logical connection or interaction between the system 102 and the server 106. The session may be a fundamental concept in networking, particularly relating to protocols and applications that may require continuous or long-lasting interactions. During a session, data may be exchanged in the form of the set of IP packets 108, and a series of requests and responses may be handled between the communicating entities. Therefore, sessions may be critical for maintaining context and state in networked applications, ensuring that data may be transmitted reliably and efficiently. It may be noted that the terms "network session" and "session" are used interchangeably throughout the entire disclosure.

As discussed above, the first set of IP packets 110 may include the first IP packet 110A, the second IP packet 110B, and the Nth IP packet 110N. The first IP packet 110A, the second IP packet 110B, and the Nth IP packet 110N may be received from the first network session established between the server 106 and the system 102 via the communication network 104. The first IP packet 110A, the second IP packet 110B, and the Nth IP packet 110N from the first network session may have the same source and destination addresses. The Internet Protocol (IP) indexing technique may help capture and manage the set of IP packets 108 efficiently for better network forensics and analysis.

The second set of IP packets 112 may include the first IP packet 112A, the second IP packet 112B, and the Nth IP packet 112N. The first IP packet 112A, the second IP packet 112B, and the Nth IP packet 112N may be received from the second network session established between the server 106 and the system 102 associated via the communication network 104. In an embodiment, the first IP packet 112A, the second IP packet 112B, and the Nth IP packet 112N from the second session may have the same source and destination addresses as that of the first IP packet 110A, the second IP packet 110B, the Nth IP packet 110N. The Internet Protocol (IP) indexing technique may help in capturing, storing, and managing the set of IP packets 108 efficiently for better network forensics and analysis.

In operation, the user 116 is associated with the system 102. The system 102 may initiate a data capture request. The data capture request may be transmitted to the server 106 which may be a web server, a cloud-based server, and the like. The data capture request may be transmitted via the communication network 104. The communication network 104 may be the internet, an intranet, or any other network infrastructure that may allow data transmission between the system 102 and the server 106.

Once the data capture request is received by the server 106, the server 106 may process the request and generate a response for the data capture request. The response may be in the form of the set of IP packets 108. The set of IP packets 108 may include various types of data such as web pages, files, and/or other digital content. The server 106 may create multiple sessions to manage the interactions initiated by the user 116 efficiently. Specifically, the server 106 may manage multiple sessions, each associated with a specific interaction or task initiated by the user 116. To facilitate the transfer of data between the server 106 and the system 102, the server 106 may generate the set of IP packets 108. The set of IP packets 108 may be a small unit of data that may be formatted for transmission over the communication network 104. Each session may involve the creation of distinct IP packets like the first set of IP packets 110 for the first session, the second set of IP packets 112 for the second session, and the like. The generated set of IP packets 108 may be transmitted from the server 106 to the system 102 via communication network 104. The communication network

104 may ensure the proper routing and delivery of these packets to their destination (i.e. the system 102).

In an embodiment, the system 102 may receive, at a first timestamp, the first IP packet associated with a first network session of a set of network sessions. The first IP packet 110A of the first set of IP packets 110 may be received via the communication network 104. The system 102 processes the received IP packets for efficient organization, storage, and retrieval.

Further, the system 102 may determine the first metadata associated with the first network session. The first metadata may include the first set of data structures associated with the received first IP packet 110A. For example, on arrival of the first IP packet 110A associated with the first network session, the first metadata of the first IP packet 110A may be determined. The determined metadata may include, for example, a raw indices array (also referred to as the first set of data structures). Details of the first metadata are further described in FIG. 3.

To process the set of IP packets, the system 102 may be configured to determine, using the second set of data structures 120, a first identifier associated with a first data structure of the third set of data structures 122. The first identifier corresponds to an address of a location where the first IP packet 110A is to be stored in the first data structure associated with the third set of data structures 122. For example, the first data structure of the second set of data structures 120 may include the first identifier including, but not limited to, a file name and an offset index of the first data structure of the third set of data structures 122 where the received first IP packet 110A may be stored. In an embodiment, the second set of data structures 120 may correspond to a ring buffer. The ring buffer, also known as a circular buffer or cyclic buffer, may be a data structure that may be used to efficiently manage a fixed-size, continuous, and cyclical sequence of data elements. It is a type of buffer or queue in which data is stored in a fixed-size array or buffer, and when the buffer is full, new data overwrites the oldest data in a circular fashion.

Further, the system 102 may be configured to store a first payload information associated with the first IP packet 110A in the first data structure of the third set of data structures 122 based on the determined first identifier. Each of the third set of data structures 122 may correspond to a raw buffer. The first data structure of the third set of data structures 122 may be determined using the first timestamp associated with the first IP packet 110A. The first payload information associated with the first IP packet 110A may be the data that may be transmitted from the server 106. The first payload information may be, but not limited to, a file, or a message. In an exemplary embodiment, the first payload information may be encapsulated within the first IP packet 110A along with the header information to facilitate communication across the network. The header information may include, but is not limited to, a source IP address, and a destination IP address.

The system 102 may be further configured to receive the second IP packet 110B associated with the first network session at a second timestamp. For example, the timestamp may refer to a record of information at which the IP packet may be received. Such information may include, but is not limited to, a time interval and date associated with the reception of the IP packet. For example, the first IP packet 110A may be received at a first timestamp that may be "1704799501" and the second IP packet 110B may be received 1 second later at the second timestamp "1704799502". In an exemplary embodiment, the first IP packet 110A and the second IP packet 110B may be received at the same timestamp. The first timestamp and the second timestamp may be determined using the time of arrival in the Unix timestamp. It may be noted that the terms "Unix timestamp" and "epoch timestamp" are used interchangeably throughout the entire disclosure.

Further, the system 102 may be configured to store a second payload information associated with the received second IP packet in one of the first data structure or a second data structure of the third set of data structure 122 based on the first timestamp and the second timestamp. For example, in an exemplary case where the first IP packet 110A and the second IP packet 110B arrive at the first timestamp say "1704799501", both the first IP packet 110A and the second IP packet 110B may be stored in the first data structure of the third set of data structures 122. Further, in a case where the first IP packet 110A arrives at the first timestamp "1704799501" and the second IP packet arrives at the second timestamp "1704799502". The first IP packet 110A may be stored in the first data structure of the third set of data structures 122 and the second IP packet 110B may be stored in the second data structure of the third set of data structures 122. Details associated with the storage of the second payload information are further described, in FIG. 3.

In one embodiment, each of the third set of data structures 122 may be associated with the set of IP packets 108 associated with the set of network sessions received in one second. The set of IP packets may include the first IP packet 110A and the second IP packet 110B. For example, in a case where the user 116 may be browsing two websites simultaneously, the system 102 may receive the first IP packet 110A from the first website and the second IP packet 110B from the second website at the same timestamp. Further, the first data structure of the third set of data structures 122 may store the first IP packet 110A and the second IP packet 110B.

The system 102 may be further configured to calculate the first timestamp associated with the first IP packet 110A and the second timestamp associated with the second IP packet 110B. Further, the system 102 may compare the calculated time interval between the first timestamp and the second timestamp with a first pre-determined timeout threshold. For example, if the first IP packet 110A arrives at the first timestamp say "1704799501" and the second IP packet 110B arrives at the second timestamp say "1704799502", the system 102 may calculate the time interval between the time of arrival and compare the calculated time interval with the pre-determined timeout threshold. The pre-determined timeout threshold may be, for example, 1 second.

In an embodiment, the system 102 may be further configured to store the second payload information in the first data structure of the third set of data structures 122 based on the determination that the calculated time interval may be less than the first pre-determined timeout threshold. For example, in a case where the second IP packet 110B may arrive within 1 second of the arrival of the first IP packet 110A. The second payload information may be stored in the first data structure of the third set of data structures 122.

In another embodiment, the system 102 may be further configured to store the second payload information in the second data structure of the third set of data structures 122 based on the determination that the calculated time interval may be greater than the first pre-determined timeout threshold. For example, in a case where the second IP packet 110B may arrive 1 second after the arrival of the first IP packet 110A, the second payload information may be stored in the second data structure of the third set of data structures 122.

In one embodiment, the first set of data structures 118 in the first metadata may include the first timestamp and the first address associated with a first location of the first payload information stored in the first data structure of the third set of data structures 122. For example, the first set of data structures 118 in the first metadata may include the time of arrival of the first IP packet 110A associated with the first network session. Further, the first set of data structures 118 of the first meta data may store the location address where the first IP packet 110A may be stored in the first data structure of the third set of data structures 122.

In another embodiment, the system 102 may be further configured to determine the second address associated with a second location of the second payload information stored in the second data structure of the third set of data structures 122. Further, the system 102 may be configured to store the determined second address in the first data structure of the third set of data structures 122. For example, in a case where the second payload information associated with the second IP packet 110B may be stored in the second data structure of the third set of data structures 122, the system 102 may determine the location information of the second payload information and store the location information in the first data structure of the third set of data structures 122. Similar steps may be followed for the determination and storage of the third address associated with a third location of the third payload information of a third IP packet associated with the first network session. The third payload information may be stored in a third data structure of the third set of data structures 122. The system 102 may further store the determined third address of the third data structure of the third set of data structures 122 in the second data structure of the third set of data structures 122.

The system 102 may be further configured to create a raw file corresponding to each data structure of the third set of data structures. For example, a first raw file may be created corresponding to the first data structure of the third set of data structures 122, and a second raw file may be created corresponding to the second data structure of the third set of data structures 122 up to an Nth raw file corresponding to the Nth data structure of the third set of data structures 122.

The system 102 may be further configured to store the first payload information that may be stored in the first data structure of the third set of data structures 122 in the first raw file. Similarly, the second payload information that may be stored in the second data structure of the third set of data structures 122 may be stored in the second raw file.

In a case where the first payload information and the second payload information may be stored in the first data structure of the third set of data structures 122, the first payload information and the second payload information may be stored in the first raw file that may be created corresponding to the first data structure of the third set of data structures 122.

In one embodiment, the first payload information stored in the first raw file may include a first header. The first header may include a packet length associated with the second payload information, a name associated with the second payload location information, and an offset associated with the second payload location information. For example, the header of the first IP packet 110A associated with the first network session may include the packet length of the second IP packet 110B associated with the first network session, the name of the raw file where the second IP packet 110B may be stored and the offset associated with the second IP packet 110B location information.

In another embodiment, the system 102 may be configured to calculate the time interval between the first timestamp associated with the first IP packet 110A and the second timestamp associated with the second IP packet 110B and compare the calculated time interval between the first timestamp and the second timestamp with a second pre-determined timeout threshold.

Further, based on the determination that the calculated time interval may be greater than the second pre-determined timeout threshold, a second metadata may be generated that may include the second timestamp and second address associated with the second location of the second payload information that may be stored in the second data structure of the third set of data structures 122. Further the system 102 may be configured to create a second data structure in the first set of data structures 118 based on generated second metadata and store the created second data structure of the first set of data structures 118.

In one embodiment, the system 102 may be configured to receive a user request associated with a retrieval of the first payload information and the second payload information. The system 102 may be configured to determine the first address associated with the first location of the first payload information that may be stored in the first data structure of the third set of data structures 122 based on the received user request. Further, the system 102 may be configured to retrieve the first payload information from the first data structure of the third set of data structures 122. The system 102 may further determine the second address associated with a second location of the second payload information stored in the second data structure of the third set of data structures 122. The system 102 may further retrieve the second payload information based on the determined second address.

FIG. 2 illustrates a block diagram 200 of the system of FIG. 1, in accordance with an embodiment of the disclosure. FIG. 2 is explained in conjunction with FIG. 1. In FIG. 2, there is shown the block diagram 200 of the system 102. The system 102 may include at least one processor 202 (referred to as a processor 202, hereinafter), at least one non-transitory memory 204 (referred to as a memory 204, hereinafter), an input/output (I/O) interface 206, and a communication interface 208. The processor 202 may be connected to the memory 204, the I/O interface 206, and the communication interface 208 through one or more wired or wireless connections. Although in FIG. 2, it is shown that the system 102 includes the processor 202, the memory 204, the I/O interface 206, and the communication interface 208 however, the disclosure may not be so limiting and the system 102 may include fewer or more components to perform the same or other functions of the system 102.

The processor 202 of the system 102 may be configured to index the incoming set of IP packets 108 for efficient storage and retrieval of the set of IP packets 108. The processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application-specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors config-
ured in tandem via the bus to enable independent execution
of instructions, pipelining, and/or multithreading. Addition-
ally, or alternatively, the processor 202 may include one or
more processors capable of processing large volumes of
workloads and operations to provide support for big data
analysis. In an example embodiment, the processor 202 may
be in communication with the memory 204 via a bus for
passing information among components of the system 102.

For example, when the processor 202 may be embodied
as an executor of software instructions, the instructions may
specifically configure the processor 202 to perform the
algorithms and/or operations described herein when the
instructions are executed. However, in some cases, the
processor 202 may be a processor-specific device (for
example, a mobile terminal or a fixed computing device)
configured to employ an embodiment of the present disclo-
sure by further configuration of the processor 202 by instruc-
tions for performing the algorithms and/or operations
described herein. The processor 202 may include, among
other things, a clock, an arithmetic logic unit (ALU), and
logic gates configured to support the operation of the pro-
cessor 202. The communication network 104 may be
accessed using the communication interface 208 of the
system 102. The communication interface 208 may provide
an interface for accessing various features and data stored in
the system 102.

The memory 204 may be non-transitory and may include,
for example, one or more volatile and/or non-volatile memo-
ries. In other words, for example, the memory 204 may be
an electronic storage device (for example, a computer read-
able storage medium) comprising gates configured to store
data (for example, bits) that may be retrievable by a machine
(for example, a computing device like the processor 202).
The memory 204 may be configured to store information,
data, content, applications, instructions, or the like, for
enabling the system 102 to carry out various functions in
accordance with an example embodiment of the present
disclosure. For example, the memory 204 may be configured
to buffer input data for processing by the processor 202. As
exemplified in FIG. 2, the memory 204 may be configured
to store instructions for execution by the processor 202. As
such, whether configured by hardware or software methods,
or by a combination thereof, the processor 202 may repre-
sent an entity (for example, physically embodied in cir-
cuitry) capable of performing operations according to an
embodiment of the present disclosure while configured
accordingly. Thus, for example, when the processor 202 is
embodied as an Application Specific Integrated Circuit
(ASIC), Field Programmable Gate Array (FPGA), or the
like, the processor 202 may be specifically configured hard-
ware for conducting the operations described herein. In an
embodiment, memory may be configured to store the first set
of data structures 118, the second set of data structures 120,
and the third set of data structures 122.

The first set of data structures 118 may be configured to
store session metadata of the incoming set of IP packets 108.
The first set of data structures 118 may correspond to, but is
not limited to, an array, a list, or a hash table. The array may
be a fundamental data structure where elements may be
organized sequentially with each element accessible by its
index within the array. The list may be a dynamic data
structure where each element may be referred to as nodes
which hold a piece of data and reference to the next element
in the sequence. The hash table may be a fundamental data
structure that may use a hash function to map keys to a specific location in the hash table where each key-value pair
may be associated with a unique index within the hash table
and the like.

In one embodiment, the first set of data structures 118 may
include metadata of IP packets associated with the network
sessions. The first data structure of the first set of data
structures 118 may be, but is not limited to, the raw indices
array. In one example, the first data structure of the first set
of data structures 118 may include metadata of the first set
of IP packets 110. The first set of IP packets 110 may be
associated with the first network session. The first data
structure of the first set of data structures 118 may include
an array of filenames. The array of filenames may include
the arrival time of the first set of IP packets 110. In an
embodiment, the arrival time of the first IP packet 110A may
be represented in the Unix timestamp. The first data struc-
ture of the first set of data structures 118 may further include
an array of offset index values. The array of offset index
values may be used to keep track of IP packets within the
data structures associated with the third set of data structures
122. The first data structure of the first set of data structures
118 may further include a last packet file name. The last
packet filename may include the name of the Nth IP packet
110N associated with the first set of IP packets 110. The
name of the file may be represented as the arrival time of the
Nth IP packet 110N in the Unix timestamp. The first data
structure of the first set of data structures 118 may further
include the last offset index value. The last offset index value
may represent the location of the Nth IP packet 110N in the
data structure associated with the third set of data structures
122.

In an exemplary embodiment, the metadata of the first set
of IP packets 110 may be stored in the first data structure of
the first set of data structures 118. In the array of filenames,
the first data structure of the first set of data structures 118
may store the file name of the first IP packet 110A associated
with the first set of IP packets 110. In the array of offset
values, the first data structure of the first set of data struc-
tures 118 may further store the location of the first IP packet
110A. The second data structure may further store the Nth IP
packet 110N filename and the location of the Nth IP packet
110N.

Further, when the difference in the time of arrival between
the first IP packet 110A and the second IP packet 110B may
be greater than a second pre-determined timeout threshold
(for example, 16 seconds), the metadata of the second IP
packet 110B may be stored as a new entry in the second data
structure of the first set of data structures 118. The processor
202 may generate second metadata that may include the
second timestamp and a second address associated with a
second location of the second payload information stored in
the second data structure of the third set of data structures
122 based on a determination that the calculated time
interval is greater than the second pre-determined timeout
threshold. Further, the processor 202 may create a second
data structure of the first set of data structures 118 based on
the generated second metadata and store the created second
data structure of the first set of data structures 118.

By way of the first example, the user 116 may initiate a
request to establish a connection with a website for example,
"www.abcxyz.com", the server 106 may receive the first IP
packet 110A that may be a SYN (synchronize) packet to
initiate a TCP (transmission control protocol) connection. In
response to the SYN packet, the second IP packet 110B
which may be an SYN-ACK (synchronize-acknowledge-
ment) packet may be received by the system 102 confirming
the establishment of the connection. In a case where the time of arrival between the SYN packet and the SYN-ACK packet is greater than the second pre-determined timeout threshold, (for example, 16 seconds), the metadata of the second IP packet 110B is stored as a new entry in the second data structure of the first set of data structures 118.

The second set of data structures 120 may be stored in the memory 204. In an embodiment, the second set of data structures 120 may be the ring buffer. The ring buffer may be a fixed-size, continuous loop of memory that stores a collection of data elements, such as bytes or records. The new elements may be added to the ring buffer that overwrites the oldest element when the ring buffer is full. The ring buffer may temporarily store the set of IP packets 108 before the set of IP packets 108 may be written on the data structures associated with the third set of data structures 122. The ring buffer may be useful for scenarios where a continuous flow of data needs to be managed, where it may be acceptable to discard old data, and when the buffer is at capacity. The ring buffer may be commonly employed in various applications, including real-time data processing, multimedia streaming, and networking.

The third set of data structures 122 which may be the raw buffer may be configured to store the incoming set of IP packets 108. The raw buffer may be of dynamic size and may be adaptable to the memory requirement of a specific application. It may be commonly employed in various applications like network forensics where it may be needed to handle high-speed data streams containing the set of IP packets 108. The raw buffer may correspond to a designated storage area that may be reserved for the temporary retention of the incoming set of IP packets 108 before storage in the memory 204 of the system 102. In one example, the first IP packet 110A associated with the first set of IP packets 110 may be stored temporarily in the raw buffer before the first IP packet 110A is written on the memory 204 of the system 102. In another example, the second IP packet 110B associated with the first set of IP packets 110 may be stored temporarily in the raw buffer before the second IP packet 110B is written on the memory of the system 102.

In some example embodiments, the I/O interface 206 may communicate with the system 102 and display the input and/or output of the system 102. As such, the I/O interface 206 may include a display and, in some embodiments, may also include a keyboard, a mouse, a touch screen, touch areas, soft keys, or other input/output mechanisms. In one embodiment, the system 102 may include a user interface circuitry configured to control at least some functions of one or more I/O interface elements such as a display and, in some embodiments, a plurality of speakers, a ringer, one or more microphones and/or the like. The processor 202 and/or I/O interface 206 circuitry including the processor 202 may be configured to control one or more functions of one or more I/O interface 206 elements through computer program instructions (for example, software and/or firmware) stored on a memory 204 accessible to the processor 202.

The communication interface 208 may include the input interface and output interface for supporting communications to and from the system 102 or any other component with which the system 102 may communicate. The communication interface 208 may be any means such as a device or circuitry embodied in either hardware or a combination of hardware and software that is configured to receive and/or transmit data to/from a communications device in communication with the system 102. In this regard, the communication interface 208 may include, for example, an antenna (or multiple antennae) and supporting hardware and/or software for enabling communications with a wireless communication network. Additionally, or alternatively, the communication interface 208 may include the circuitry for interacting with the antenna(s) to cause transmission of signals via the antenna(s) or to handle receipt of signals received via the antenna(s). In some environments, the communication interface 208 may alternatively or additionally support wired communication. As such, for example, the communication interface 208 may include a communication modem and/or other hardware and/or software for supporting communication via cable, digital subscriber line (DSL), universal serial bus (USB), or other mechanisms.

FIG. 3 is a diagram that illustrates exemplary operations for indexing of IP packets, in accordance with an embodiment of the disclosure. FIG. 3 is explained in conjunction with elements of FIG. 1, and FIG. 2. With reference to FIG. 3, there is shown a block diagram 300 that illustrates exemplary operations from 302A to 302H, as described herein. The exemplary operations illustrated in the block diagram 300 may start at 302A and may be performed by the system 102 of FIG. 1 or the processor 202 of FIG. 2.

At 302A, a first IP packet 110A reception operation is performed. In an embodiment, the user 116 may initiate a request to establish a data connection with a network. In an embodiment, the processor 202 may be configured to receive a first IP packet 110A associated with a first network session of a set of network sessions. In an example, the processor 202 may be further configured to render the set of IP packets 108 received from the server 106 based on the request initiated by the user 116. The set of IP packets 108 may be associated with a set of network sessions. A network session may be a logical connection established between the system 102 and the server 106. The set of IP packets 108 may be transmitted between the system 102 and the server 106 through the communication network 104. For example, the user 116 associated with the system 102 may initiate a request to access multiple websites such as "www.xyz.com" and "www.abc.com" up to an Nth website. The system 102 may receive the set of IP packets 108 that may correspond to above-mentioned websites. For example, the system 102 may receive the first set of IP packets 110 associated with a first session between the system 102 and a server associated with the website "www.xyz.com". Similarly, the system 102 may be configured to receive the second set of IP packets 112 associated with a second session between the system 102 and a server 106 associated with the website "www.abc-.com".

At 302B, a first metadata determination operation is performed. In an embodiment, the processor 202 may be configured to determine the first metadata 304 associated with the first network session. Further, the processor 202 may be configured to store the first metadata in the first data structure of the first set of data structures 118 of the first metadata 304. The first metadata may include the first set of data structures 118 associated with the received first IP packet 110A. The first metadata 304 may formatted in a particular file for example, but not limited to, a JavaScript Object Notation (JSON) file, a Hypertext Markup Language (HTML) file, a Comma-Separated Values (CSV) file, and an Extensible Markup Language (XML) file, a Yet Another Markup Language (YAML) file.

In an exemplary embodiment, the processor 202 may receive the first set of IP packets 110 associated with the first network session. The processor 202 may be configured to create the first data structure in the first set of data structures 118. The first data structure of the first set of data structures 118 may be an array for example, but not limited to, a raw indices array. The raw indices array may include the information of the first IP packet 110A associated with the first set of IP packets 110. Such information may include, but is not limited to, an offset value, a file name, and a probe ID.

For example, in a case where the first IP packet 110A, that may be the SYN packet, arrives at the timestamp "1702034991", the raw indices array may store the offset of the SYN packet, the timestamp of the SYN packet, and the probe ID of the SYN packet. The raw indices array of the SYN packet may be represented as follows:

```
raw_indices: [
    {
        "offset": 4,
        "file": 1702034991,
        "probe_id": 0
    }
].
```

At 302C, a first identifier determination operation is performed. In an embodiment, the processor 202 may be configured to determine the first identifier associated with the first data structure of the third set of data structures 122. The third set of data structures 122 may be associated with a set of IP packets 108 associated with the set of network sessions received in one second. The third set of data structures 122 may include the plurality of data structures. In an exemplary embodiment, upon receiving at the first timestamp, the first IP packet 110A associated with the first network session, the processor 202 may determine using the second set of data structures 120, the first identifier associated with the first data structure of the third set of data structures. Based on the determined first identifier, the processor 202 may store the first IP packet 110A in the first data structure of the third set of data structures 122. Each of the one or more data structures associated with the second set of data structure 120 may include at least two fields, wherein the at least one of the two fields may correspond to a first pointer that may point to its corresponding data structure of the third set of data structures 122 and a second pointer that may point to an index of the corresponding data structure of the third set of data structures 122. The each of one or more data structures of the third set of data structures 122 may correspond to a raw buffer. The raw buffer may be a storage that may temporarily store the set of IP packets 108 before the set of IP packets 108 may be dumped on to the memory of the system 102.

At 302D, a first payload information storage operation is performed. In an embodiment, the processor 202 may be configured to store the first payload information associated with the first IP packet 110A in the first data structure of the third set of data structures 122. The first payload information associated with the first IP packet 110A may include the data that may be transmitted between the system 102 and the server 106. The transmitted data may be a message or a file that may be encapsulated within the IP packet.

In an exemplary embodiment, the SYN packet that may be the first IP packet 110A, the payload information of the SYN packet may be stored in the first data structure of the third set of data structures 122. In an embodiment, the first payload information associated with the first IP packet 110A may be stored in the first raw file. The first raw file may be associated with the first data structure of the third set of data structures 122.

At 302E, a second IP packet reception operation is performed. In an embodiment, the processor 202 may be configured to receive the second IP packet 110B associated with the first set of IP packets 110. The second IP packet

110B may be the SYN-ACK packet. The SYN-ACK packet may be sent by the server 106 to the system 102 in response to the SYN packet. The location to store the second IP packet 110B in the third set of data structures 122 may be determined by calculating the time interval between the first timestamp and the second timestamp and comparing the calculated time interval with the first pre-determined timeout threshold. The first timestamp may be associated with the arrival time of the first IP packet 110A and the second timestamp may be associated with the arrival time of the second IP packet 110B.

At 302F, it may be determined whether the time interval between the reception of the first IP packet and the second IP packet is greater than the first pre-determined timeout threshold or not. The first IP packet 110A and the second IP packet 110B may be associated with the first set of IP packets 110, wherein the first set of IP packets 110 may be associated with the first network session. The first IP packet 110A may be received at the first timestamp and the second IP packet 110B may be received at the second timestamp. The timestamp may be used to record the time of arrival of the set of IP packets 108. In one example, the processor 202 may be configured to calculate the time of arrival of the first IP packet 110A in milliseconds by using the following equation (1):

$$\text{Time in milli second} = (\text{epoch timestamp}) * 1000 + (\text{packet offset} \quad (1)$$
$$\text{position} * 1000)/\text{file size in bytes}.$$

Where in the equation (1),
Epoch timestamp is a numeric representation of a specific point in time,
Packet offset position is the specific byte position within each of the one or more data structures of the third set of data structures 122 from where a particular IP packet begins, and
File size in bytes is the size of the data file that may contain the set of IP packets 108.
In another example, the processor 202 may be configured to calculate the time of arrival of the first IP packet 110A in microseconds by using the following equation (2):

$$\text{Time in microseconds} = (\text{epoch timestamp}) * 1000000 + (\text{packet offset} \quad (2)$$
$$\text{position} * 1000000)/\text{file size in bytes}.$$

Where in the equation (2),
Epoch timestamp is a numeric representation of a specific point in time,
Packet offset position is the specific byte position within each of the one or more data structures of the third set of data structures 122 from where a particular IP packet begins, and
File size in bytes is the size of the data file that may contain the set of IP packets 108.
It may be noted that the same calculations may be followed by the processor 202 to calculate the time of arrival for the second IP packet 110B up to the Nth IP packet 110N associated with the first set of IP packets 110.

Further, the processor 202 may be configured to use the above-mentioned equations (1) or (2) to calculate the arrival time of the IP packets associated with the second set of IP packets 112 up to the Nth set of IP packets 114.

In an exemplary embodiment, the processor 202 may be configured to calculate the time interval between the first timestamp associated with the first IP packet 110A and the second timestamp associated with the second IP packet 110B. The processor 202 may be further configured to compare the calculated time interval with a first pre-determined timeout threshold. The first pre-determined timeout threshold may be equal to 1 second.

In an embodiment, where the time interval between the first IP packet and the second IP packet is greater than a first pre-determined timeout threshold, the control may pass to step 302G. On the contrary, where the time interval between the first IP packet and the second IP packet is not greater than a first pre-determined timeout threshold, the control may pass to step 302H.

At 302G, based on the calculated time interval being greater than the first pre-determined timeout threshold, the first IP packet 110A payload information associated with the first IP packet 110A may be stored in the first data structure of the third set of data structures 122 and the second IP packet 110B payload information associated with the second IP packet 110B may be stored in the second data structure of the third set of data structures 122. For example, after the reception of the first IP packet 110A, the processor 202 may be configured to determine the reception time of the second IP packet 110B and determine the time difference between the arrival time of the first IP packet 110A and the arrival time of the second IP packet 110B. Further, the processor 202 may be configured to compare the determined time difference and the first pre-determined timeout threshold (such as 1 second). Specifically, when the determined time difference is greater than the first pre-determined timeout threshold, the processor 202 is configured to store the second IP packet 110B payload information associated with the second IP packet 110B in the second data structure of the third set of data structures 122.

At 302H, based on the calculated time interval being less than the first pre-determined timeout threshold, the first IP packet 110A payload information and the second IP packet 110B payload information may be stored in the first data structure of the third set of data structure 122. For example, after the reception of the first IP packet 110A, the processor 202 may be configured to determine the reception time of the second IP packet 110B and determine the time difference between the arrival time of the first IP packet 110A and the arrival time of the second IP packet 110B. Further, the processor 202 may be configured to compare the determined time difference and the first pre-determined timeout threshold (such as 1 second). Specifically, when the determined time difference is less than the first pre-determined timeout threshold, the processor 202 is configured to store the second IP packet 110B payload information associated with the second IP packet 110B in the first data structure of the third set of data structures 122.

Therefore, the system 102 may focus on IP packet indexing, thereby enhancing user experience in network packet management and analysis. Such indexing of IP packets enhances the capabilities of network forensics, making it an invaluable asset for security incident response and investigation. Further, such operations performed by the system 102 for IP packet indexing may extend to an optimized storage utilization, resulting in cost savings and an improved overall network performance.

FIG. 4 is a diagram 400 that illustrates exemplary indexing of a ring buffer and a raw buffer, in accordance with an embodiment of the disclosure. FIG. 4 is explained in conjunction with elements of FIG. 1, FIG. 2, and FIG. 3. FIG.

4 may include the second set of data structures 120, and the third set of data structures 122. The second set of data structures 120 may include the first data structure 120A, the second data structure 120B, and an Nth data structure 120N. The third set of data structures 122 may include the first data structure 122A, the second data structure 122B, and an Nth data structure 122N.

The second set of data structures 120 may be implemented as a fixed-size one-dimensional linked list in memory. The second set of data structures 120 may correspond to the ring buffer. The ring buffer may have a circular or wrap-around structure. When the end of the ring buffer is reached, the data element may be stored at the beginning of the ring buffer and a loop may be created. To manage the data within the ring buffer, two pointers may be used, the pointers may keep track of the current position for reading the data from and writing the data to the third set of data structures 122.

The third set of data structures 122 may correspond to the raw buffers. In the disclosed internet protocol (IP) packets indexing technique, the ring buffer may play a crucial role in managing and organizing the incoming set of IP packets 108. The ring buffer may be used to create an efficient system for processing the set of IP packets 108 before the set of IP packets 108 may be written to the set of raw buffers. As an example, the size of the ring buffer may be 64.

In one embodiment, the second set of data structures 120 may include the first data structure 120A. The first data structure 120A may include at least the first field. The first field may include a first pointer that may point to the corresponding data structure of the third set of data structures 122 and a second pointer that may point to an index within the corresponding data structure of the third set of data structures 122. The index may refer to the value that may indicate the location in the corresponding data structure of the third set of data structure 122 where the new IP packet is to be written.

In an exemplary embodiment, the first data structure 120A associated with the second set of data structures 120 may include at least the first field. The first field may include the first pointer, the first pointer may point to the first data structure 122A associated with the third set of data structures 122. The first field may further include the second pointer that may point to the index of the first data structure 122A of the third set of data structures 122 where the newly received IP packet is to be written.

In another exemplary embodiment, the second data structure 120B associated with the second set of data structures 120 may include at least the first field. The first field may include the first pointer that may point to the second data structure 122B associated with the third set of data structures 122. The first field may further include the second pointer that may point to an index of the second data structure 122B where the newly received IP packet is to be written.

In yet another exemplary embodiment, the Nth data structure 120N associated with the second set of data structures 120 may include at least the first field The field may include a first pointer that may point to the Nth data structure 122N associated with the third set of data structures 122. The field may further include the second pointer that may point to an index of the Nth data structure 122N of the third set of data structure 122 where the newly received IP packet is to be written.

In an embodiment, the third set of data structures 122 may further include the first data structure 122A, and the second data structure 122B, up to Nth data structure 122N. The third set of data structures 122 may store and organize the incoming set of IP packets 108. In one embodiment, when the set of IP packets 108 may arrive at the system 102, the set of IP packets 108 may be stored in the each of the data structures associated with the third set of data structure 122 based on the arrival time of the set of IP packets 108. The processor 202 may be further configured to create the raw files corresponding to each data structure of the third set of data structures 122.

In one embodiment, the location to write the first IP packet 110A associated with the first set of IP packets 110 may depend on the first timestamp of the first IP packet 110A. The equation (3) used to select the data structure associated with the second set of data structures 120 may be:

$$\text{Arrival Unix timestamp \% ring buffer size} \qquad (3)$$

Where in the equation (3),

The arrival Unix timestamp is the time of arrival of the first IP packet 110A, and The ring buffer size may indicate the total number of data structures in the second set of data structures 120. For example, the size of the ring buffer may be 64.

The above equation may be used to select the data structure from the second set of data structures 120 for all the IP packets associated with the first set of IP packets 110, the second set of IP packets 112, and the Nth set of IP packets 114.

Consider the first example where the first IP packet 110A, which may be the SYN packet may arrive at a first timestamp. The first timestamp may be for example, —1704799501. The processor 202 may employ the equation (3) to determine the data structure from one or more data structures associated with the second set of data structures 120. For example, the ring buffer size is 64, on computing the equation (3), arrival Unix timestamp % ring buffer size (1704799501% 64), the computed result may be 13. The determined data structure of the second set of data structures 120 will be the $13^{th}$ data structure.

In another embodiment, the first IP packet 110A associated with the first set of IP packets 110 may be stored in the index zero of the data structure selected from the third set of data structures 122. In the exemplary case mentioned above, the first IP packet 110A, which may be the SYN packet, may be stored in the data structure of the third set of data structures 122 corresponding to the $13^{th}$ data structure of the second set of data structure 120.

Further, the index where the second IP packet 110B may be the SYN-ACK packet associated with the first set of IP packets 110 arriving at the same timestamp as the first IP packet 110A associated with the first set of IP packets 110 may be stored may be determined by adding a numeric value for example, 12 to the sum of the length of the first IP packet 110A. Considering the first example, the SYN packet may be stored in the $0^{th}$ index of the data structure of the third set of data structures 122 corresponding to the $13^{th}$ data structure of the second set of data structures 120 and the index of the data structure of the third set of data structures 122 corresponding to the $13^{th}$ data structure of the second set of data structure 120 where the SYN-ACK packet arriving at the same timestamp may be stored may be determined by adding a numeric value, for example, 12 to the sum of the length of the SYN packet.

In another embodiment, based on the second IP packet 110B which may be the SYN-ACK packet associated with the first set of IP packets 110 arriving at the second timestamp, the second IP packet 110B that may be the SYN-ACK packet may be stored in the data structure of the third set of data structures 122 depending on the arrival time of the second IP packet 110B.

Considering the first example, where the SYN-ACK packet may arrive at the second timestamp, where the second timestamp may be 1704799502. The data structure of the third set of data structures 122 where the SYN-ACK packet may be stored may be determined by computing the equation (3). The processor 202 may compute the equation (3), on computing (1704799502% 64) the result may be 14. The second payload information associated with the SYN-ACK packet arriving at the second timestamp may be stored in the data structure of the third set of data structures 122 corresponding to the $14^{th}$ data structure of the second set of data structures 120. Further in an embodiment, the system 102 may send an ACK (acknowledgment) packet to the server 106 acknowledging the response of the SYN-ACK packet. The processor 202 may compute the equation (3) to determine the location to store the payload information associated with the ACK packet in the data structure of the third set of data structures 122.

In one embodiment, once the IP packets stored in the data structures of the third set of data structures 122 may be stored in the memory of the system 102. The value of the index of the data structures of the third set of data structures 122 may be set to zero.

In another embodiment, the first data structure 122A, the second data structure 122B up to the Nth data structure 122N associated with the third set of data structures 122 may have a specific capacity and time limit. In one example, the set of IP packets 108 that may have been in the first data structure 122A of the third set of data structures 122 for a pre-set time period may be dumped on the memory of the system 102 as the raw file. The raw file may be associated with each of the third set of data structures 122. This may help the first data structure 122A of the third set of data structures 122 from over-flowing and may ensure that a set of IP packets 108 may be continually processed. The pre-set time period may be, for example, 32 seconds.

FIG. 5 is a block diagram 500 that illustrates the structure of an internet protocol (IP) packet, in accordance with an embodiment of the disclosure. FIG. 5 is explained in conjunction with elements of FIG. 1, FIG. 2, FIG. 3, and FIG. 4. With reference to FIG. 5, there is shown the block diagram 500 of the structure of the IP packet. The IP packet may include two sections an IP packet header 502 and an IP packet data 504. The IP packet header 502 may further include a packet length 502A, a subsequent IP packet file name 502B, and a packet offset 502C.

In one embodiment, the first IP packet 110A associated with the first set of IP packets 110 may be an example of the internet protocol (IP) packet. The IP packet may contain 14 bytes for the IP packet header 502. The IP packet header 502 may contain essential information necessary for the proper routing and delivery of the IP packet from the server 106 to the system 102. The IP packet header 502 may further contain a time-to-live (TTL) field that may ensure that the IP packet does not circulate indefinitely within the communication network 104. The IP packet header 502 may further contain protocol information that may be responsible for further processing of the data, such as a Transmission Control Protocol (TCP), and a user datagram protocol (UDP).

The IP packet header 502 may further include the packet length 502A, the packet length 502A may be of the size of 2 bytes. The packet length 502A may specify the total length of the IP packet including both the IP packet header 502 and IP packet data 504. The packet length 502A may allow the system 102 to determine the IP Packet size and may help differentiate between the IP packet header 502 and IP packet data 504. On determination of the packet length 502A, the system 102 may validate that the IP packet data 504 may have not been transmitted in its entirety and that the IP packet data 504 may have not been lost during the transmission.

The IP packet header 502 may further include the subsequent IP packet file name 502B. The subsequent IP packet file name 502B may be, for example, of 4 bytes. In an exemplary embodiment, the subsequent IP packet file name 502B of the first IP packet 110A associated with the first set of IP packets 110 may store the file name of the second IP packet 110B associated with the first set of IP packets 110. The first set of IP packets 110 may be associated with the first network session. In one example, based on the determination of the file name of the second IP packet 110B that may be stored in the subsequent IP packet file name 502B of the first IP packet 110A, it may be easier for the user 116 associated with the system 102 to retrieve the second IP packet 110B information without needing to iterate through all the raw files.

The IP packet header 502 may further include packet offset 502C. The packet offset 502C may be, for example, of 8 bytes. The packet offset 502C may be used to determine the location of the IP packet in the raw file. In one example, the packet offset 502C may indicate the location from where the first IP packet 110A associated with the first set of IP packet 110 begins within the raw file. On determination of the packet offset 502C the need for extensive data parsing may be eliminated and the process may become more efficient in high-speed network environments.

The IP packet header 502 may further include the IP packet data 504. The IP packet data 504 may be the data that may be transmitted from the server 106 to the system 102 over the communication network 104. The IP packet data 504 may allow end-to-end communication between the server 106 and the system 102. The IP packet data 504 may be text, files, images, commands, and the like. In one example, the IP packet data 504 may contain HTML content of web pages.

FIG. 6 is a block diagram 600 that illustrates the method for accessing the raw data file 602, in accordance with an embodiment of the disclosure. FIG. 6 is explained in conjunction with elements of FIG. 1, FIG. 2, FIG. 3, FIG. 4, and FIG. 5. FIG. 6 may include raw data files 602. The raw data files 602 may include a first raw file 602A, a second raw file 602B, a third raw file 602C, a fourth raw file 602D, a fifth raw file 602E, a sixth raw file 602F, a seventh raw file 602G, eighth raw file 602H, up to Nth raw file 602N.

In one embodiment, the raw data file 602 may be a file format and data organization method that may store the set of IP packets 108. The raw files such as the first raw file 602A, the second raw file 602B, to the Nth raw file 602N may be created based on one file per second per IP probe. In another embodiment, the first raw file 602A, the second raw file 602B, up to the Nth raw file 602N may follow a specific naming convention.

In one embodiment, the raw file may be created based on one file per second per IP probe. The IP probe may be a monitoring device (such as the system 102 or the server 106) that may be designed to capture and analyze network traffic. In one embodiment, the system 102 may be an exemplary embodiment of the monitoring device. In another embodiment, the creation of the raw file may follow a specific naming convention. For example, the name of the raw file may be in a specific format "yyyy/mm/ss/hh/mi/probe-id_unix-ts.raw". The prototype of the path of the raw file may be a "user-defined-root-path/year/month/day/hour/minutes/probe-id_unixTimestampInSeconds.raw". In one example, the name of the raw file may be /var/lib/raw/2021/8/30/13/2/0_1630308751.raw. In another example, the name of the raw file may be /var/lib/raw/2021/8/30/13/2/0_1630308752.raw and the like.

In yet another embodiment, the set of IP packets 108 that may be captured by the system 102 may be segmented based on the time of arrival. The system 102 may timestamp the first IP packet 110A and the second IP packet 110B associated with the first set of IP packets 110 to record the time of arrival of the first set of IP packets 110. Based on the time of arrival of the first IP packet 110A and the second IP packet 110B, the first IP packet 110A and the second IP packet 110B may be stored in the raw files. The raw data files 602 may be associated with the third set of data structures 122. For example, the first raw file 602A may be associated with the first data structure 122A of the third set of data structures 122. Similarly, the second raw file 602B may be associated with the second data structure 122B of the third set of data structures 122.

In one exemplary embodiment, the subsequent IP packet file name 502B associated with the IP packet header 502 of the first IP packet 110A associated with the first set of IP packets 110 in the first raw file 602A may contain the filename of the second IP packet 110B associated with first session IP packets 110. The second IP packet 110B associated with the first session of IP packet 110 may be stored in the fifth raw file 602E. The subsequent IP packet file name 502B associated with the IP packet header 502 of the Nth IP packet 110N associated with the first set of IP packets 110 may contain "NULL" as Nth IP packet 110N may be the last packet of the first session of IP packets 110.

Traditionally, writing the set of IP packets 108 to their corresponding data file may not be possible. There may have been a large number of input/output operations performed on the storage disk. Various software may have been used to write IP packets to the PCAP files based on the time of arrival and the number of IP packets. The PCAP files may not contain the session metadata. In one condition, when the user 116 associated with the system 102 may want to retrieve the set of IP packets associated with the first set of IP packets 110, the user 116 may have to parse all the PCAP files of all the network sessions sequentially from the first raw file 602A in order to retrieve the files containing IP packets associated with the first set of IP packets 119 where the first set of IP packets 110 may be associated with the first network session of the set of network sessions. The traditional technique may increase the time complexity to O(n).

In the disclosed IP packet indexing technique, the IP packet header 502 may contain the information of the next IP packet that may belong to the same network session. The disclosed technique of IP packet indexing may make it easier for the user 116 associated with the system 102 to retrieve the IP packets associated with the same network session.

In an exemplary embodiment, where the user 116 associated with the system 102 may want to retrieve the first IP packet 110A and second IP packet 110B associated with the first set of IP packets 110, the system 102 may determine the location of the first IP packet 110A in the first data structure of the first set of data structures 118. Further, the user 116 may determine the location of the second IP packet 110B in the subsequent IP packet file name 502B associated with the IP packet header 502 of the first IP packet 110A. For example, the first IP packet 110A may be stored in the first raw file 602A and the second IP packet 110B may be stored in the fifth raw file 602E.

In an exemplary case, the system 102 may receive the first set of IP packets 110, and where the first set of IP packets may include the SYN packet, the SYN-ACK packet, the ACK packet, and a FIN packet. The first set of IP packets 110 may be associated with the first network session. The FIN packet may be the last packet received from the server 106. The FIN packet may be sent to close a connection between the server 106 and the system 102. The SYN packet and the SYN-ACK packet may be received at the first timestamp, the ACK packet may be received 1 second after the arrival of the SYN packet and the SYN-ACK packet at the second timestamp and the FIN packet may be received 1 second after the arrival of the ACK packet at the third timestamp. The SYN packet and the SYN-ACK packet may be stored in the first raw file 602A. The name of the first raw file 602A may be, for example, 0_1634567890.raw. Similarly, the ACK packet may be stored in the second raw file 602B. The name of the second raw file 602B may be, for example, 0_1634567891.raw. Further, the FIN packet may be stored in the third raw file 602C. The name of the third raw file 602C may be, for example, 0_1634567892.raw. The IP packet header 502 of the SYN packet may include packet length 502A that may be, for example, 1500 bytes. Further, the IP packet header 502 of the SYN packet may include the SYN-ACK packet file name which may be 0_1634567890.raw. The IP packet header 502 of the SYN packet may further include the packet offset 502C which may be, for example, 96000.

Further, the IP packet header 502 of the SYN-ACK packet may include packet length 502A which may be, for example, 1400 bytes. Further, the IP packet header 502 of the SYN-ACK packet may include the ACK packet file name which may be 0_1634567891.raw. The IP packet header 502 of the SYN-ACK packet may further include the packet offset 502C which may be, for example, 16000.

The IP packet header 502 of the ACK packet may include packet length 502A that may be, for example, 1600 bytes. Further, the IP packet header 502 of the ACK packet may include the FIN packet file name which may be 0_1634567892.raw. The IP packet header 502 of the SYN packet may further include the packet offset 502C which may be, for example, 4000.

Further, the IP packet header 502 of the FIN packet may include packet length 502A that may be, for example, 2000 bytes. Further, the IP packet header 502 of the FIN packet may include the Subsequent IP packet file name 502B which may be NULL as the FIN packet may be the last packet received from the first network session. The IP packet header 502 of the FIN packet may further include the packet offset 502C that may be, for example, 0.

In an exemplary embodiment, in a case where the user 116 may want to retrieve the packets associated with the first network session, the processor 202 may enable the user 116 to retrieve the filename of the SYN packet that may be stored in the first set of data structures 118. The filename of the SYN-ACK packet may be retrieved from the IP packet header 502 of the SYN packet. Further, the filename of the ACK packet may be retrieved from the IP packet header 502 of the SYN-ACK packet. The filename of the FIN packet may be retrieved from the IP packet header 502 of the ACK packet.

Following the above technique, the user 116 associated with the system 102 may just have to parse the raw data files 602 which may contain the first IP packet 110A and the second IP packet 110B associated with the first set of IP packets 110. The above-mentioned technique may bring down the time complexity to O (1). Therefore, the raw data files 602 may allow efficient retrieval of the set of IP packets 108 from the set of network sessions. Instead of searching through all the raw files associated with the indexed raw data files 602, the user 116 may retrieve the IP packets by accessing only the concerned data files. The disclosed system 102 may provide an optimized and efficient technique for indexing and storing the IP packets, in order to streamline the network packet management process for network infrastructure.

FIG. 7 is a flowchart that illustrates an exemplary method for indexing IP packets, in accordance with an embodiment of the disclosure. FIG. 7 is explained in conjunction with elements from FIGS. 1, 2, 3, 4, 5 and 6. With reference to FIG. 7 there is shown the flowchart 700. The operations of the exemplary method may be executed by any computing system, for example, by the system 102 of FIG. 1 or the processor 202 of FIG. 2. The operations of the flowchart 700 may start at 702.

At 702, the first internet protocol (IP) packet 110A associated with the first network session of the set of network sessions is received at the first timestamp. In an embodiment, the processor 202 may be configured to receive the first internet protocol (IP) packet associated with the first network session of a set of network sessions at the first timestamp. Details of receiving the first IP packet 110A are provided in FIG. 1.

At 704, the first metadata associated with the first network session is determined. In an embodiment, the processor 202 may be configured to determine the first metadata associated with the first network session. The first metadata includes the first set of data structures 118 associated with the received first IP packet. Details of determining the first metadata are provided in FIG. 2.

At 706, using the second set of data structures 120, the first identifier associated with the first data structure of the third set of data structures 122 is determined. In an embodiment, the processor 202 may be configured to determine, using the second set of data structures 120, the first identifier associated with the first data structure of the third set of data structures 122.

At 708, the first payload information associated with the first IP packet in the first data structure of the third set of data structures 122 is stored based on the determined first identifier. In an embodiment, the processor 202 may be configured to store the first payload information associated with the first IP packet in the first data structure of the third set of data structures 122 based on the determined first identifier. Details of storing the first payload information are provided in FIG. 4.

At 710, the second IP packet associated with the first network session at the second timestamp is received. In an embodiment, the processor 202 may be configured to receive the second IP packet associated with the first network session at the second timestamp. Details of receiving the second IP packet 110B are provided in FIG. 1.

At 712, the second payload information associated with the received second IP packet is stored. In an embodiment, the processor may be configured to store the second payload information associated with the received second IP packet in one of the first data structures or the second data structure 122B of the third set of data structures 122 based on the first timestamp and the second timestamp. Details of storing the second IP packet 110B are provided in FIG. 4.

Accordingly, blocks of the flowchart 700 support combinations of means for performing the specified functions and combinations of operations for performing the specified functions. It will also be understood that one or more blocks of the flowchart 700, and combinations of blocks in the flowchart 700, can be implemented by special-purpose hardware-based computer systems which perform the specified functions, or combinations of special-purpose hardware and computer instructions.

Alternatively, the system 102 may comprise means for performing each of the operations described above. In this regard, according to an example embodiment, examples of means for performing operations may comprise, for example, the processor and/or a device or circuit for executing instructions or executing an algorithm for processing information as described above.

Various embodiments of the disclosure may provide a non-transitory computer-readable medium and/or storage medium having stored thereon, instructions executable by a machine and/or a computer to operate a system (e.g., the system 102) to index internet protocol (IP) packets. The instructions may cause the machine and/or computer to perform operations including receiving, at a first timestamp, a first IP packet associated with a first network session of a set of network sessions. The operations may further include determining first metadata associated with the first network session. The first metadata may include a first set of data structures 118 associated with the received first IP packet 110A. The operations may further include determining, using a second set of data structures 120, a first identifier associated with a first data structure of a third set of data structures 122. The operations may further include storing a first payload information associated with the first IP packet 110A in the first data structure 122A of the third set of data structures 122 based on the determined first identifier. The operations may further include receiving a second IP packet 110B associated with the first network session at a second timestamp. The operation may further include storing a second payload information associated with the received second IP packet 110B in one of the first data structure 122A or a second data structure 122B of the third set of data structures 122 based on the first timestamp and the second timestamp.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of reactants and/or functions, it should be appreciated that different combinations of reactants and/or functions may be provided by alternative embodiments without departing from the scope of the appended claims. In this regard, for example, different combinations of reactants and/or functions than those explicitly described above are also contemplated as may be set forth in some of the appended claims. Although specific terms are employed herein, they are used in a generic and descriptive sense only and not for purposes of limitation.

What is claimed:

1. A system comprising:
processor configured to:

receive, at a first timestamp, a first Internet Protocol (IP) packet associated with a first network session of a set of network sessions;

determine first metadata associated with the first network session, wherein the first metadata comprises of a first set of data structures associated with the received first IP packet;

determine, using a second set of data structures, a first identifier associated with a first data structure of a third set of data structures;

store a first payload information associated with the first IP packet in the first data structure of the third set of data structures based on the determined first identifier;

receive a second IP packet associated with the first network session at a second timestamp; and store a second payload information associated with the received second IP packet in one of: the first data structure or a second data structure of the third set of data structures based on the first timestamp and the second timestamp.

2. The system of claim 1, wherein the second set of data structures corresponds to a ring buffer.

3. The system of claim 1, wherein each of the third set of data structures is associated with a set of IP packets associated with the set of network sessions received in one second, and wherein the set of IP packets comprises of the first IP packet and the second IP packet.

4. The system of claim 1, wherein the processor is further configured to:

calculate a time interval between the first timestamp associated with the first IP packet and the second timestamp associated with the second IP packet; and compare the calculated time interval between the first timestamp and the second timestamp with a first pre-determined timeout threshold.

5. The system of claim 4, wherein the processor is further configured to:

store the second payload information in the first data structure of the third set of data structures based on a determination that the calculated time interval is less than the first pre-determined timeout threshold.

6. The system of claim 4, wherein the processor is further configured to:

store the second payload information in the second data structure of the third set of data structures based on a determination that the calculated time interval is greater than the first pre-determined timeout threshold.

7. The system of claim 4, wherein the first pre-determined timeout threshold is equal to one second.

8. The system of claim 1, wherein the first set of data structures in the first metadata comprises of the first timestamp and a first address associated with a first location of the first payload information stored in the first data structure of the third set of data structures.

9. The system of claim 1, wherein the processor is further configured to:

determine a second address associated with a second location of the second payload information stored in the second data structure of the third set of data structures;

store the determined second address in the first data structure of the third set of data structures;

determine a third address associated with a third location of a third payload information of a third IP packet associated with the first network session, wherein the third payload information is stored in a third data structure of the third set of data structures; and store the determined third address in the second data structure of the third set of data structures.

10. The system of claim 1, wherein the processor is further configured to create a raw file corresponding to each data structure of the third set of data structures.

11. The system of claim 1, wherein the first payload information is stored in a first raw file associated with the first data structure of the third set of data structures, and wherein the second payload information is stored in a second raw file associated with the second data structure of the third set of data structures.

12. The system of claim 1, wherein the processor is further configured to dump a raw file associated with each of the third set of data structures into a memory of the system after a pre-set time period.

13. The system of claim 1, wherein the each of the second set of data structures comprises of at least a first field comprising a first pointer that points to a corresponding data structure of the third set of data structures and a second pointer that points to an index within the corresponding data structure of the third set of data structures.

14. The system of claim 1, wherein the first payload information stored in a first raw file comprises of a first header, and wherein the first header comprises of a packet length associated with the second payload information, a name associated with the second payload information, and an offset associated with the second payload information.

15. The system of claim 1, wherein the processor is further configured to:
calculate a time interval between the first timestamp associated with the first IP packet and the second timestamp associated with the second IP packet; and
compare the calculated time interval between the first timestamp and the second timestamp with a second pre-determined timeout threshold.

16. The system of claim 15, wherein the processor is further configured to:
generate, based on a determination that the calculated time interval is greater than the second pre-determined timeout threshold, second metadata comprises of the second timestamp and a second address associated with a second location of the second payload information stored in the second data structure of the third set of data structures,
create a second data structure of the first set of data structures based on the generated second metadata; and
store the created second data structure of the first set of data structures.

17. The system of claim 1, wherein the processor is further configured to:
receive a user request associated with a retrieval of the first payload information and the second payload information;
determine a first address associated with a first location of the first payload information stored in the third data structure of the first set of data structures based on the received user request;
retrieve the first payload information from the first data structure;
determine a second address associated with a second location of the second payload information stored in the second data structure of the third set of data structures; and retrieve the second payload information based on the determined second address.

18. A method comprising:
receiving, at a first timestamp, a first Internet Protocol (IP) packet associated with a first network session of a set of network sessions;
determining first metadata associated with the first network session, wherein the first metadata comprises of a first set of data structures associated with the received first IP packet;
determining, using a second set of data structures, a first identifier associated with a first data structure of a third set of data structures;
storing a first payload information associated with the first IP packet in the first data structure of the third set of data structures based on the determined first identifier;
receiving a second IP packet associated with the first network session at a second timestamp; and
storing a second payload information associated with the received second IP packet in one of: the first data structure or a second data structure of the third set of data structures based on the first timestamp and the second timestamp.

19. The method of claim 18, further comprising:
receiving a user request associated with a retrieval of the first payload information and the second payload information;
determining a first address associated with a first location of the first payload information stored in the third data structure of the first set of data structures based on the received user request;
retrieving the first payload information from the first data structure;
determining a second address associated with a second location of the second payload information stored in the second data structure of the third set of data structures; and
retrieving the second payload information based on the determined second address.

20. A non-transitory computer-readable medium having stored thereon, computer-executable instructions that when executed by a processor of a system, causes the processor to execute operations, the operations comprising:
receiving, at a first timestamp, a first Internet Protocol (IP) packet associated with a first network session of a set of network sessions;
determining first metadata associated with the first network session, wherein the first metadata comprises of a first set of data structures associated with the received first IP packet;
determining, using a second set of data structures, a first identifier associated with a first data structure of a third set of data structures;
storing a first payload information associated with the first IP packet in the first data structure of the third set of data structures based on the determined first identifier;
receiving a second IP packet associated with the first network session at a second timestamp; and
storing a second payload information associated with the received second IP packet in one of: the first data structure or a second data structure of the third set of data structures based on the first timestamp and the second timestamp.

* * * * *